US006774161B2

(12) United States Patent
Hashemzadeh et al.

(10) Patent No.: US 6,774,161 B2
(45) Date of Patent: Aug. 10, 2004

(54) PROCESS FOR THE COLD MOLDING OF PARTICULATE MATERIALS

(75) Inventors: Abdulmajid Hashemzadeh, Burgkirchen (DE); Klaus Kohlhammer, Marktl (DE); Thomas Lehmann, Sinzing (DE); Peter Weiler, Geretstried (DE)

(73) Assignee: Wacker Polymer Systems GmbH & Co. KG, Burghausen (DE)

( * ) Notice: Subject to any disclaimer, the term of this patent is extended or adjusted under 35 U.S.C. 154(b) by 0 days.

(21) Appl. No.: 10/354,479

(22) Filed: Jan. 30, 2003

(65) Prior Publication Data

US 2003/0151158 A1 Aug. 14, 2003

(30) Foreign Application Priority Data

Feb. 14, 2002 (DE) .......................................... 102 06 127

(51) Int. Cl.$^7$ ................................ C08J 3/00; C08J 5/12; C08L 1/00; C08K 11/00; C08K 3/40
(52) U.S. Cl. ........................... 524/13; 524/16; 524/494; 524/556; 524/563; 524/567; 524/571; 524/577; 524/579; 264/122; 264/126
(58) Field of Search ............................... 264/109–128; 524/16, 494, 556, 563, 567, 571, 577, 579, 63

(56) References Cited

U.S. PATENT DOCUMENTS

| | | | |
|---|---|---|---|
| 4,925,529 A | 5/1990 | Dotzauer et al. | |
| 5,094,791 A | 3/1992 | Nopper | |
| 5,888,616 A | 3/1999 | Ang | |
| 6,156,682 A | 12/2000 | Fletemier et al. | |
| 6,214,456 B1 | 4/2001 | Boyd et al. | |
| 6,599,455 B2 * | 7/2003 | Wierer et al. ................ | 264/118 |
| 2002/0032253 A1 | 3/2002 | Lorenz et al. | |

FOREIGN PATENT DOCUMENTS

| | | |
|---|---|---|
| DE | 38 41 560 A1 | 6/1990 |
| DE | 44 42 858 A1 | 6/1996 |
| EP | 0283195 | 3/1988 |
| EP | 0501352 | 2/1992 |
| EP | 0 649 725 A2 | 10/1994 |
| GB | 2 345 302 A | 7/2000 |
| JP | 08118353 A | 5/1996 |
| WO | WO 96/09927 | 4/1996 |
| WO | WO 98/50617 | 11/1998 |

OTHER PUBLICATIONS

Derwent Abstract Corresponding To DE 44 42 858 [AN 1996–269144].
Derwent Abstract Corresponding To DE 38 41 560 [AN 1990–186503].
Patent Abstract of Japan to JP–A 08118353 including MAT.
Polymer Handbook, 2nd Edition, J. Wiley & Sons, New York / 1975.
Fox T.G., Bull. Am. Physics Soc. 1,3. p. 123 / 1956.
P. Carreau, Rheology of Polymeric Systems 1997, Carl Hanser Verlag.
Patent Abstracts of Japan, vol. 005, No. 168 [c–077] corresp. to JP 56 098251.
Patent Abstracts of Japan, vol. 2000, No. 13 corresp. to JP 2000 290385.
Derwent Abstract corresp. to WO 96/09927 [AN 1996–172542].

* cited by examiner

Primary Examiner—Stephen J. Lechert, Jr.
(74) Attorney, Agent, or Firm—Brooks Kushman P.C.

(57) ABSTRACT

Particulate materials are cold molded by preheating a binder and the material to be bound to a temperature of from 160 to 240° C., and then press molding at a temperature less than 80° C. and at a pressure of from 1 to 120 bar to give a molding, wherein the binder contains a polymer powder or aqueous polymer dispersion thereof, the polymer having a glass transition temperature Tg greater than 80° C. and a complex viscosity less than 15,000 Pa·s at 190° C., and derived from one or more comonomer units from the group of vinyl esters of optionally branched $C_{1-18}$ alkylcarboxylic acids, (meth)acrylic esters of optionally branched $C_{1-15}$ alcohols, dienes, olefins, vinylaromatics, and vinyl halides. The moldings exhibit excellent properties including resistance to sagging at elevated temperatures, and are recyclable.

12 Claims, No Drawings

PROCESS FOR THE COLD MOLDING OF PARTICULATE MATERIALS

BACKGROUND OF THE INVENTION

1. Field of the Invention

The invention relates to a process for the cold molding of particulate materials, in particular of fiber materials, using, as binders, non-crosslinkable, thermoplastic polymers, in the form of polymer powder or in the form of an aqueous polymer dispersion.

2. Background Art

Composite materials based on fiber materials are used in the automotive industry, aircraft industry, and construction industry. The sheets have to be stiff and sound-absorbent, and have to have adequate heat resistance. There are various production processes for these composite materials. An example of an application for the automotive industry is the roofliner. To produce roofliners, the desired properties are achieved via the combination of polyester fibers and bicomponent polyester fibers (bico fibers) with glass fiber mats, the glass fiber mats being used to increase stiffness and heat resistance. The bico fibers have a core material with high melting point and a shell with low melting point. In the cold molding process, polyester nonwovens and glass fiber mats are heated at a temperature above the melting point of the fiber shell material and then press-molded at low temperature to give a molding. The temperatures in the heating phase are from 160 to 240° C., depending on melting point, and the molding temperature is well below the melting point of the fiber shell, at from about 20 to 60° C. In the press, the fibers become bonded during cooling under pressure. This procedure is termed cold molding.

Since the processing of glass fiber leads to skin irritation and poses problems during recycling, novel solutions are being sought which do not require such fibers. U.S. Pat. No. 6,214,456 describes the production of a roofliner using bico fiber, polyurethane foam being used for reinforcement instead of glass fiber. A disadvantage is the inadequate sound absorption of the resultant composite materials. In U.S. Pat. No. 6,156,682, the composite material is reinforced by using thermally crosslinkable (thermosetting) polymers, without glass fiber. U.S. Pat. No. 5,888,616 discloses the disadvantages of the use of thermally crosslinkable polymers: the materials bonded therewith cannot later be recycled. The latter publication therefore describes the production of recyclable materials using glass fiber, polyester fiber, and polyester bico fiber. The polyester fibers have a variety of titers and melting points.

SUMMARY OF THE INVENTION

An object of the present invention is to provide composite materials which, even without glass fiber content, have high heat resistance and are recyclable. These and other objects are met through the use of specific polymer powders or aqueous dispersions thereof as cold molding binders.

DETAILED DESCRIPTION OF THE PREFERRED EMBODIMENT(S)

The invention thus provides a process for the cold molding of particulate materials, where the binder and the material to be bound are first preheated to a temperature of from 160 to 240° C., and then, preferably within a period of from 1 to 20 sec, at a temperature less than 80° C., and at a pressure of from 1 to 120 bar, are press-molded to give a molding, wherein as a binder, a polymer in the form of a polymer powder or in the form of an aqueous polymer dispersion thereof is employed, the glass transition temperature Tg of the polymer being greater than 80° C. and its complex viscosity being less than 15,000 Pa·s at 190° C., made from one or more comonomer units from the group consisting of vinyl esters of unbranched or branched ("optionally branched") alkylcarboxylic acids having from 1 to 18 carbon atoms, (meth)acrylic esters of branched or unbranched ("optionally branched") alcohols having from 1 to 15 carbon atoms, dienes, olefins, vinylaromatics, and vinyl halides.

Suitable vinyl esters are vinyl esters of optionally branched carboxylic acids having from 1 to 18 carbon atoms. Preferred vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having from 5 to 11 carbon atoms, examples being VeoVa9® or VeoVa10® (trade names of Shell). Vinyl acetate is particularly preferred.

Suitable monomers from the (meth)acrylic ester group are esters of optionally branched alcohols having from 1 to 15 carbon atoms. Preferred (meth)acrylic esters are methyl acrylate, methyl methacrylate, ethyl acrylate, ethyl methacrylate, propyl acrylate, propyl methacrylate, n-butyl acrylate, n-butyl methacrylate, tert-butyl acrylate, tert-butyl methacrylate, 2-ethylhexyl acrylate, and norbornyl acrylate. Particular preference is given to methyl acrylate, methyl methacrylate, n-butyl acrylate, 2-ethylhexyl acrylate, and norbornyl acrylate.

Suitable dienes are 1,3-butadiene and isoprene. Examples of copolymerizable olefins are ethene and propene. Vinylaromatics which may be copolymerized include styrene and vinyltoluene. From the group of the vinyl halides, vinyl chloride is usually used.

In one preferred embodiment, the polymer also contains from 0.1 to 50% by weight, based on the total weight of the polymer, of one or more comonomer units from the group consisting of carboxy-functional and hydroxy-functional monomers.

Suitable carboxy-functional comonomers are ethylenically unsaturated mono- and dicarboxylic acids, preferably acrylic acid, methacrylic acid, crotonic acid, itaconic acid, fumaric acid, and maleic acid. The carboxy function may also be introduced into the copolymer by copolymerizing maleic anhydride. Suitable hydroxy-functional comonomers are hydroxyalkyl acrylates and hydroxyalkyl methacrylates having a $C_1$–$C_8$-alkyl radical, preferably hydroxyethyl (meth)acrylate, hydroxypropyl (meth)acrylate, and hydroxybutyl (meth)acrylate.

Particular preference is given to carboxy-functional comonomer units, those most preferred being those derived from acrylic acid, from methacrylic acid, from crotonic acid, from itaconic acid, from fumaric acid, from maleic acid, or from maleic anhydride. The proportion of functional units is particularly preferably from 0.1 to 25% by weight, most preferably from 3 to 20% by weight, based in each case on the total weight of the copolymer.

Preference is given to the polymers mentioned below, which optionally also contain the functional-group-containing units as described immediately above: vinyl ester-ethylene copolymers such as vinyl acetate-ethylene copolymers; vinyl ester-ethylene-vinyl chloride copolymers, where the vinyl ester is preferably vinyl acetate and/or vinyl propionate and/or one or more copolymerizable vinyl esters such as vinyl laurate, vinyl pivalate, vinyl 2-ethylhexanoate, or vinyl esters of an alpha-branched carboxylic acid having from 5 to 11 carbon atoms, in particular vinyl versatate (VeoVa9®, VeoVa10®); vinyl acetate copolymers with one or more copolymerizable vinyl esters such as vinyl laurate, vinyl pivalate, vinyl 2-ethylhexanoate, or vinyl esters of an alpha-branched carboxylic acid having from 5 to 11 carbon atoms, in particular vinyl versatate (VeoVa9®, VeoVa10®), optionally containing ethylene as well; vinyl ester-acrylic ester copolymers, in particular those of vinyl acetate and butyl acrylate and/or 2-ethylhexyl acrylate, optionally also containing ethylene; vinyl ester-acrylic ester copolymers of vinyl acetate and/or vinyl laurate, and/or vinyl versatate as the vinyl esters, and butyl acrylate or 2-ethylhexyl acrylate as the acrylic esters, further optionally containing ethylene.

Particular preference is given to (meth)acrylic ester polymers and to styrene polymers, for example copolymers of n-butyl acrylate and/or 2-ethylhexyl acrylate; copolymers of methyl methacrylate with butyl acrylate and/or 2-ethylhexyl acrylate, and/or 1,3-butadiene; styrene-1,3-butadiene copolymers and styrene (meth)acrylic ester copolymers such as styrene-butyl acrylate, styrene-methyl methacrylate-butyl acrylate, or stryene-2-ethylhexyl acrylate, where the butyl acrylate used may comprise n-, iso-, or tert-butyl acrylate.

The greatest preference is given to carboxy-functional styrene-n-butyl acrylate copolymers, carboxy-functional methyl methacrylate-n-butyl acrylate copolymers, and carboxy-functional styrene-methyl methacrylate-n-butyl acrylate copolymers, the carboxy groups being introduced by way of acrylic acid units and/or methacrylic acid units.

The selection of the monomers and/or their proportions by weight is such that the polymers have a glass transition temperature Tg greater than 80° C. The glass transition temperature Tg of the polymers may be determined in a known manner by differential scanning calorimetry (DSC). The Fox equation may also be used for an approximate preliminary calculation of the Tg. According to T. G. *Fox, Bull. Am. Physics Soc.* 1, 3, page 123 (1956): $1/Tg=x_1/Tg_1 + x_2/Tg_2 + \ldots + x_n/Tg_n$, where $x_n$ is the fraction by weight (% by weight/100) of the monomer n, and $Tg_n$ is the glass transition temperature in Kelvin of the homopolymer of the monomer n. Tg values for homopolymers are listed in Polymer Handbook $2^{nd}$ Edition, J. Wiley & Sons, New York (1975).

The polymers may be prepared by known free-radical-initiated polymerization processes, for example by solution polymerization, aqueous suspension polymerization, or aqueous emulsion polymerization. Emulsion polymerization is preferred. Any of the familiar drying processes may be used to dry the solutions or dispersions: spray drying, drum drying, freeze drying, belt drying or coagulation followed by fluidized-bed drying. The polymers are preferably prepared using spray-drying or drum-drying processes. During the drying process, it is also possible, where appropriate, to add additives such as flame retardants, plasticizers, fillers, or complexers.

Complex viscosity is understood to mean dynamic viscosity. P. Carreau, *Rheology of Polymeric Systems*, Carl Hanser Verlag 1997. The complex viscosity of the polymer may be adjusted in a known manner via the molecular weight and/or the amount of functional comonomer units. Preference is given to a complex viscosity at 190° C. of less than 8000 mPas.

In cold molding, the polymer, in the form of polymer powder or in the form of aqueous polymer dispersion, preferably in the form of polymer powder, is used to produce moldings from particulate materials such as fiber materials, from particulates composed of mineral materials, from plastics, or from natural substances such as wood chips, cork particles, and glass particles, or from combinations of these materials. The preferred application is the application as a binder for fiber materials. Natural or synthetic raw fiber materials are suitable. Examples of these are synthetic fibers based on fiber-forming polymers, examples being viscose fiber, polyester fiber such as chopped polyester fiber, polyamide fiber, polypropylene fiber, polyethylene fiber, polyethylene terephthalate (PET) fiber, bicomponent polyester fibers (bico fibers), e.g. high-crystallinity bicomponent polyester fibers, and fiber mixtures made from these fibers. Mineral fibers are also suitable, examples being glass fibers, ceramic fibers, and carbon fibers. Examples of natural fiber materials are wood fibers, cellulose fibers, wool fibers, cotton fibers, jute fibers, flax fibers, hemp fibers, coir fibers, ramie fibers, and sisal fibers. The fibers may also be in the form of wovens, in the form of yarns, or in the form of nonwovens such as nonwoven scrims or formed-loop knits. These nonwovens may, where appropriate, have been mechanically preconsolidated, for example by needling.

The amount of the polymer generally used in cold molding is from 5 to 90% by weight, preferably from 20 to 70% by weight, based on the material to be bound. The amount of binder depends on the desired stiffness of the press-molded molding.

One procedure for producing the moldings is to mix the fibers with the polymer powder or with the aqueous polymer dispersion, laying up the fiber/polymer mixture by conventional nonwoven technology methods, optionally after carding of the fiber/polymer mixture and/or needling, followed by preheating and cold molding in the abovementioned pressure and temperature ranges. Another method of binding the fiber is to scatter or spray the binder composition into a woven fabric or nonwoven scrim, or into a fiber bed, where appropriate after carding the fiber/polymer mixture and/or needling, and then to preheat and cold mold in the abovementioned pressure and temperature ranges.

The process for the cold molding of particulate materials is preferably used to produce moldings for interior automotive trim, most preferably for producing automotive roofliners. The use of binders based on non-crosslinkable thermoplastic polymers permits the production of automotive roofliners with adequate stiffness and with heat resistance at 85° C. from polyester fibers such as PET, without any use of glass fibers. Due to the thermoplastic character of the binder, these moldings differ from thermoset binders in being recyclable.

The examples below serve for further description of the invention:

The following binder powders were tested, each containing 2% by weight of inorganic antiblocking agent:

Comparative Powder A

A copolymer of 85% by weight of styrene, 5% by weight of butyl acrylate, 1% by weight of acrylic acid, and 9% by weight of methacrylic acid, prepared by emulsion polymerization without a chain transfer agent (e.g. dodecyl mercaptan).

Powder B

A copolymer of 85% by weight of styrene, 5% by weight of butyl acrylate, 1% by weight of acrylic acid, and 9% by weight of methacrylic acid, prepared by emulsion polymerization using, based on the weight of the monomer, 0.25% by weight of dodecyl mercaptan as a chain transfer agent.

Powder C

A copolymer of 75% by weight of styrene, 10% by weight of methyl methacrylate, 5% by weight of butyl acrylate, 1% by weight of acrylic acid, and 9% by weight of methacrylic acid, prepared by emulsion polymerization using, based on the weight of the monomers, 0.4% by weight of dodecyl mercaptan as a chain transfer agent.

Powder D

A copolymer of 89% by weight of styrene, 5% by weight of butyl acrylate, 1% by weight of acrylic acid, and 5% by weight of methacrylic acid, prepared by emulsion polymerization using, based on the weight of the monomers, 0.4% by weight of dodecyl mercaptan as a chain transfer agent.

Comparative Powder E

A copolymer of 74% by weight of styrene, 20% by weight of butyl acrylate, 1% by weight of acrylic acid, and 5% by weight of methacrylic acid, prepared by emulsion polymerization using, based on the weight of the monomers, 0.4% by weight of dodecyl mercaptan as a chain transfer agent.

Powder F

A crosslinked copolymer of 75% by weight of styrene, 15% by weight of butyl acrylate, 10% by weight of glycidyl methacrylate, prepared by emulsion polymerization using, based on the weight of the monomers, 0.4% by weight of dodecyl mercaptan as a chain transfer agent.

Comparative Powder G

90% by weight of powder E plus 10% by weight of powder F

Comparative Powder H

90% by weight of powder C plus 10% by weight of powder F

Production of Fiber Moldings for Testing

To produce pressed sheets, a 1200 g/m² polyester nonwoven of 38 mm thickness was used. 60% by weight of polymer powder, based on nonwoven weight, were incorporated into the nonwoven by means of scatter-application and vibration. The nonwoven was heated for 2 min at a temperature of 240° C. in an oven and then compressed at 50° C. under a pressure of 120 bar to a thickness of 3 mm.

Test Methods

Complex Melt Viscosity

Complex melt viscosity of the binder powders was determined by mechanical oscillation measurements using a Bohlin CVO 120 HR rheometer. The measurements were carried out using a plate-plate arrangement (20 mm) with deformation of 0.05. The test frequency was 1 Hz.

Heat Resistance

For heat-resistance testing, strips of the test specimens were cut with linear dimensions 240×20 mm. These strips were secured horizontally on a flat substrate, so that a length of 100 mm of the strips protruded over the edge of the substrate. A 10 g weight was suspended from the test strips. Heat resistance was determined by measuring flexion after aging for 2 and 24 hours at 85° C.

The results are presented in the table below. The results show that the binder powders (powders B, C, and D) with high Tg (above 80° C.) and with complex viscosity less than 15,000 mPas have very good heat resistance. Particularly good results are obtained with a complex viscosity less than 8000 mPas (powders C, D). The use of crosslinkers brings about a marked impairment of the heat resistance of the moldings (comparative powders G and H). With excessively low Tg, the results obtained are again unsatisfactory (comparative powder E).

TABLE

| Powder | Amount [% by wt.] | Tg [° C.] | Complex viscosity/190° C. [Pa · s] | Heat res. 85° C./ 2 h [mm] | Heat res. 85° C./ 24 h [mm] |
|---|---|---|---|---|---|
| — | — | — | — | 71 | 82 |
| A(c) | 60 | 105 | 15,100 | 62 | 70 |
| B | 60 | 105 | 8600 | 43 | 48 |
| C | 60 | 110 | 4600 | 15 | 26 |
| D | 60 | 95 | 2500 | 16 | 25 |
| E (c) | 60 | 65 | 100 | 52 | 59 |
| G (c) | 60 | 65/60 | — | 45 | 50 |
| H (c) | 60 | 105/60 | — | 49 | 55 | c = comparative example

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for the cold molding of particulate materials employing a binder, comprising preheating the binder and said particulate material to be bound to a temperature of from 160 to 240° C., followed by press molding at a temperature less than 80° C. and at a pressure of from 1 to 120 bar to produce a molding, wherein said binder comprises a polymer powder or an aqueous polymer dispersion thereof, the glass transition temperature Tg of the polymer being greater than 80° C. and the complex viscosity of the polymer being less than 15,000 Pa·s at 190° C., said polymer containing one or more comonomer units selected from the group consisting of vinyl esters of optionally branched $C_{1-18}$ alkylcarboxylic acids, (meth)acrylic esters of optionally branched $C_{1-15}$ alcohols, dienes, olefins, vinylaromatics, and vinyl halides.

2. The process of claim 1, wherein the binder comprises a polymer selected from the group consisting of vinyl acetate polymers, vinyl ester-ethylene copolymers, vinyl ester-ethylene-vinyl chloride copolymers, vinyl acetate copolymers containing one or more copolymerizable vinyl esters, vinyl ester-acrylic ester copolymers, (meth)acrylic ester polymers, styrene polymers, styrene-1,3-butadiene copolymers, styrene (meth)acrylic ester copolymers, and mixtures thereof.

3. The process of claim 1, wherein the polymer also contains from 0.1 to 50% by weight, based on the total weight of the polymer, of one or more comonomer units selected from the group consisting of carboxy-functional and hydroxy-functional monomers.

4. The process of claim 3, wherein the polymer contains from 0.1 to 25% by weight of carboxy-functional comonomer units selected from the group consisting of acrylic acid, methacrylic acid, crotonic acid, itaconic acid, fumaric acid, maleic acid, maleic anhydride, and mixtures thereof.

5. The process of claim 1, wherein the binder comprises one or more of a carboxy-functional styrene-n-butyl acrylate copolymer, a carboxy-functional methyl methacrylate-n-butyl acrylate copolymer, or a carboxy-functional styrene-methyl methacrylate-n-butyl acrylate copolymer, the carboxy groups being acrylic acid units and/or methacrylic acid units.

6. The process of claim 1, wherein the particulate materials comprise fiber materials.

7. The process of claim 6, wherein at least one of said particulate materials is selected from the group consisting of wood chips, cork particles, and glass particles.

8. The process as claimed in claim 6, wherein the fiber material comprise natural fibers, synthetic fibers, or mixtures thereof.

9. The process of claim 8, wherein said synthetic fiber materials are selected from the group consisting of viscose fiber, polyester fiber, bicomponent polyester fiber, polyamide fiber, polypropylene fiber, polyethylene fiber, polyethylene terephthalate fiber, and mixtures of these fibers.

10. A molding for interior automotive trim, prepared by the process of claim 1.

11. An automotive roofliner, prepared by the process of claim 1.

12. The process of claim 1, wherein at least one of said particulate materials is made from minerals, from plastics, or from natural substances.

* * * * *